(12) United States Patent  
Lee et al.

(10) Patent No.: US 8,748,020 B2
(45) Date of Patent: Jun. 10, 2014

(54) ENERGY STORAGE DEVICE

(71) Applicant: LS Mtron Ltd., Gyeonggi-do (KR)

(72) Inventors: Ha-Young Lee, Gyeonggi-do (KR);
Jin-A Kang, Gyeonggi-do (KR);
Jun-Ho Kim, Seoul (KR); Sang-Hyun Bae, Gyeonggi-do (KR)

(73) Assignee: LS Mtron, Ltd, Gyeonggi-Do (KR)

( * ) Notice: Subject to any disclaimer, the term of this patent is extended or adjusted under 35 U.S.C. 154(b) by 0 days.

(21) Appl. No.: 13/922,736

(22) Filed: Jun. 20, 2013

(65) Prior Publication Data

US 2013/0280562 A1   Oct. 24, 2013

Related U.S. Application Data

(62) Division of application No. 13/019,714, filed on Feb. 2, 2011, now abandoned.

(30) Foreign Application Priority Data

Feb. 5, 2010   (KR) .................. 10-2010-0011102
Feb. 5, 2010   (KR) .................. 10-2010-0011103

(51) Int. Cl.
*H01M 2/06* (2006.01)
*H01M 2/12* (2006.01)
*H01G 9/008* (2006.01)
*H01G 9/08* (2006.01)
*H01G 9/12* (2006.01)

(52) U.S. Cl.
USPC .............. 429/54; 429/94; 429/175; 429/179; 361/502; 361/518; 361/520; 361/521; 361/538

(58) Field of Classification Search
USPC .............. 429/54, 94, 175, 179; 361/502, 518, 361/520, 521, 538
See application file for complete search history.

(56) References Cited

U.S. PATENT DOCUMENTS

| 7,817,404 B2 | 10/2010 | Miura et al. |
| 8,098,481 B2 | 1/2012 | Zong et al. |
| 2006/0034036 A1 | 2/2006 | Miura et al. |

FOREIGN PATENT DOCUMENTS

| CN | 101160636 A | 4/2008 |
| JP | H08-287896 | 11/1996 |
| JP | H10-312783 | 11/1998 |
| JP | H11-339746 | 12/1999 |
| JP | 2009-111240 | 5/2009 |
| KR | 10-2009-0102396 | 9/2009 |
| WO | 2007130059 A1 | 11/2007 |

OTHER PUBLICATIONS

Korean Patent Office Action dated May 12, 2011 in Korean Patent Application No. 10-2010-0011103.
Korean Patent Office Action dated May 11, 2011 in Korean Patent Application No. 10-2010-0011102.

*Primary Examiner* — Gregg Cantelmo
(74) *Attorney, Agent, or Firm* — Stroock & Stroock & Lavan LLP

(57) ABSTRACT

An energy storage device includes an electrode unit in which a cathode having a cathode lead, an anode having an anode lead, and a separator located between the cathode and the anode to separate the cathode and the anode from each other are rolled together; a housing receiving the electrode unit; an electrolyte filled in the housing; an inner terminal arranged in the housing to face the electrode unit; and an outer terminal connected to the inner terminal. A groove is formed in a side of the inner terminal, and a side protrusion is formed on an inner wall of the housing at a location corresponding to the groove.

13 Claims, 3 Drawing Sheets

ENERGY STORAGE DEVICE

CROSS-REFERENCE TO RELATED APPLICATION

This application is a divisional application of U.S. application Ser. No. 13/019,714, now abandoned, which claims priority to Korean Patent Application No. 10-2010-0011102 and No. 10-2010-0011103 filed in Republic of Korea on Feb. 5, 2010, the entire contents of which are incorporated herein by reference.

BACKGROUND OF THE INVENTION

1. Field of the Invention

The present invention relates to an energy storage device, and more particularly to an energy storage device that maximizes the utilization of the inside of a housing by the improvement of an inner structure thereof and also ensures the reliability by keeping an inner pressure below a certain level.

2. Description of the Related Art

Generally, representative examples of a device storing an electric energy are batteries and capacitors. Among them, a capacitor is an energy storage device, which is called a ultra capacitor or a super capacitor and has features in between an electrolytic condenser and a secondary battery.

Such an energy storage device makes side reactions at an interface between an electrolyte and an electrode when being misused with an overvoltage or the like or used for a long time at high temperature, and gas is generated as a byproduct accordingly.

Considering the generation of gas, a conventional energy storage device is designed to have some space between an electrode unit and an inner side of the housing of the energy storage device.

However, in a case where the energy storage device is used for a transportation means such as a vehicle, the electrode unit in the housing may be shaken right and left due to an external force such as vibration, and accordingly the electrode unit or a lead wire connected thereto may be broken, which results in the deterioration of life or reliability of the energy storage device.

In addition, in a case where the inner pressure of the housing keeps increasing due to the generation of gas, the housing may swell out, or gas may be leaked at a weak region of the housing, which may cause explosion.

In order to prevent such explosion caused by the generation of gas, a notch structure is formed in a partial region of the housing of the conventional energy storage device, so that the notch is fractured at a pressure over a certain level to allow the relief of pressure.

However, in this case, the housing is kept in an opened state after the notch of the housing is fractured, which may seriously deteriorate the performance of the energy storage device due to the leakage of electrolyte or the introduction of impurities.

SUMMARY OF THE INVENTION

The present invention is designed to solve the problems of the prior art, and therefore it is an object of the present invention to provide an energy storage device capable of preventing an electrode unit from being broken due to an external force such as vibration by improving an inner structure of the energy storage device. Also, another object of the present invention is to improve the reliability of the energy storage device by preventing the excessive increase of an inner pressure of the housing and intercepting the introduction of impurities into the housing from the outside.

In order to accomplish the above object, the present invention provides an energy storage device, which includes an electrode unit in which a cathode having a cathode lead, an anode having an anode lead, and a separator located between the cathode and the anode to separate the cathode and the anode from each other are rolled together; a housing receiving the electrode unit; an electrolyte filled in the housing; an inner terminal arranged in the housing to face the electrode unit; an outer terminal connected to the inner terminal; and a pressure relief unit for relieving an inner pressure of the housing, wherein a groove is formed in a side of the inner terminal, and a side protrusion is formed on an inner wall of the housing at a location corresponding to the groove, wherein openings are respectively formed in the inner terminal and the outer terminal for the communication with the outside, and wherein the pressure relief unit is installed in the openings and selectively opens the openings in association with the change of the inner pressure of the housing when the inner pressure is increased over an allowable level.

Preferably, the electrode unit is coupled with the inner terminal by laser welding.

Preferably, the side protrusion is formed by partially denting the side of the housing, and the side protrusion is formed to be fit with the groove of the inner terminal.

Preferably, the outer terminal is fixed by bending an upper portion of the housing.

Preferably, the energy storage device according to the present invention further includes a sealing member provided to the outer terminal at a location where the upper portion of the housing is bent and fixed.

Preferably, the energy storage device according to the present invention further includes an insulation film between the housing and both of the inner and outer terminals.

Preferably, the housing has a cylindrical shape, and the inner terminal and the outer terminal are respectively constituted by a cathode terminal or an anode terminal at upper and lower portions of the housing.

Preferably, the pressure relief unit is installed in the opening of the outer terminal.

Preferably, the energy storage device according to the present invention further includes a coupling member installed through the openings of the inner and outer terminals to couple the inner and outer terminals with each other, the coupling member having a hollow therein, wherein the pressure relief unit is mounted to a head of the coupling member so that the hollow of the coupling member is selectively opened or closed.

Preferably, the energy storage device according to the present invention further includes a fixing member for fixing the pressure relief unit to the openings.

Preferably, the energy storage device according to the present invention further includes a sealing means interposed between the pressure relief unit and the fixing member.

Preferably, the fixing member and the coupling member may be coupled to the openings by screwing, inserting, or inserting and laser-welding.

Preferably, the opening of the inner terminal may have a different diameter from the opening of the outer terminal, and the opening of the inner terminal may have a relatively smaller diameter than the opening of the outer terminal.

In another aspect of the present invention, there is also provided an energy storage device, which includes an electrode unit in which a cathode having a cathode lead, an anode having an anode lead, and a separator located between the cathode and the anode to separate the cathode and the anode from each other are rolled together; a housing receiving the electrode unit; an electrolyte filled in the housing; an inner terminal arranged in the housing to face the electrode unit; an outer terminal connected to the inner terminal; and a pressure relief unit for relieving an inner pressure of the housing, wherein openings are respectively formed in the inner and outer terminals for the communication with the outside, and the pressure relief unit is installed in the openings and selectively opens the openings in association with the change of the inner pressure of the housing when the inner pressure is increased over an allowable level.

According to the present invention, it is possible to prevent an electrode unit from being broken due to vibration or the like by improving an inner structure of an energy storage device. Also, it is possible to design the housing into a slimmer shape and increase the capacity of the energy storage device by eliminating any need to ensure a separate space between the inside of the housing and the electrode unit. In addition, it is possible to prevent the excessive increase of an inner pressure of the housing and also the introduction of external impurities into the housing. Moreover, an opening of an electrode terminal may be used as an electrolyte injection hole, which allows simplifying the assembling process of the energy storage device.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
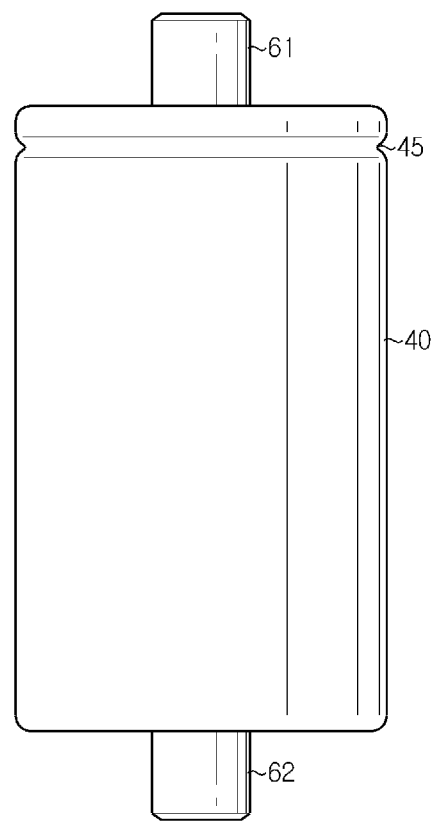
FIG. 1 is a perspective view showing an appearance of an energy storage device according to the present invention.
Figure 2:
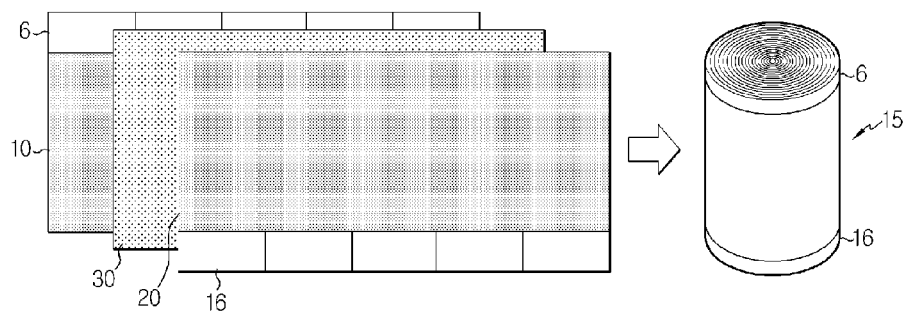
FIG. 2 is a perspective view showing exploded and assembled states of electrodes, a separator, and leads, which are rolled and arranged in the energy storage device according to the present invention.
Figure 3:
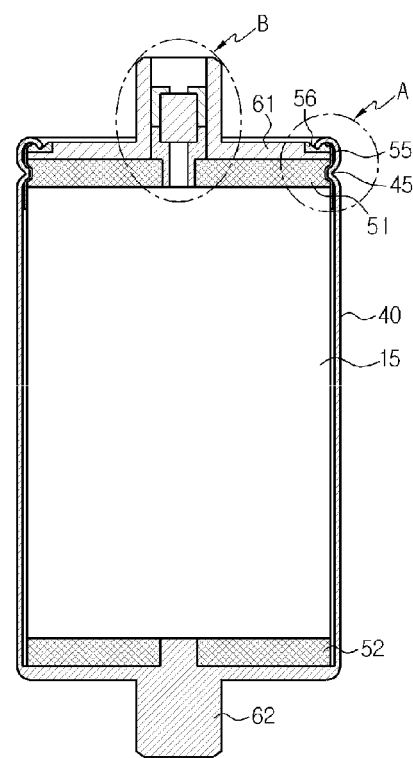
FIG. 3 is a sectional view showing an inner configuration of the energy storage device according to the present invention.

FIG. 1 is a perspective view showing an appearance of an energy storage device according to the present invention, FIG. 2 is a perspective view showing exploded and assembled states of electrodes, a separator, and leads, which are rolled and arranged in the energy storage device according to the present invention, and FIG. 3 is a sectional view showing an inner configuration of the energy storage device according to the present invention.

Referring to FIGS. 1 to 3, an energy storage device according to the present invention includes an electrode unit 15 in which a cathode 10 having a cathode lead 6, an anode 20 having an anode lead 16, and a separator 30 located between the cathode 10 and the anode 20 to electrically separate the cathode 10 and the anode 20 from each other are rolled together; a housing 40 receiving the electrode unit 15; an electrolyte filled in the housing 40; inner cathode and anode terminals 51, 52 arranged in the housing 40 to face the electrode unit 15; and outer cathode and anode terminals 61, 62 connected to the inner cathode and anode terminals 51, 52, respectively. Also, a groove 53 is formed in a side of the inner cathode terminal 51, and a side protrusion 45 is formed on an inner wall of the housing 40 at a location corresponding to the groove 53 and fitted into the groove 53.

The energy storage device according to the present invention includes the housing 40 made of metal material, and the cathode 10 and the anode 20, which are mounted in the housing 40.

As shown in FIG. 2, the cathode 10 has a metallic current collector, and an active material layer made of porous active carbon. The cathode lead 6 is connected to one side of the cathode 10.

The current collector is generally constituted with a metallic foil, and the active material layer is formed by widely applying active carbon on both surfaces of the metallic current collector.

The active material layer allows storing positive or negative electric energy, and the current collector serves as a passage of charges emitted from or supplied to the active material layer.

Between the cathode 10 and the anode 20, which are laminated subsequently, the separator 30 is arranged to limit electronic conduction between the cathode 10 and the anode 20, and an electrolyte is filled in the housing 40.

Here, the porous active material layer contains micro pores similar to a spherical shape, and thus has a great surface area. Also, the porous active material layer gives a function of active material identically to the cathode 10 and the anode 20, and the surface of each porous active material layer contacts the electrolyte.

If a voltage is applied to the cathode 10 and the anode 20, cations and anions contained in the electrolyte are moved to the cathode 10 and the anode 20, respectively, and then penetrate into the micro pores of the porous active material layer.

Here, the electrode, in other words the cathode 10 or the anode 20, and the lead may be produced separately and then connected with each other. However, it is also possible that, in a state where the current collector and the lead are integrally formed with a metallic foil, the active material layer is applied to the current collector so that the electrode and the lead are integrally formed.

In a state where the cathode 10, the anode 20, and the separator 30, which are laminated as above, are rolled into a cylindrical shape, the cathode and anode leads 6, 16 connected to the cathode 10 and the anode 20 may be evenly bent, thereby forming the electrode unit 15.

At this time, in order to facilitate the easy bending of the cathode and anode leads 6, 16, the cathode and anode leads 6, 16 may be cut at regular intervals in a length direction thereof.

In addition, in order to prevent short-circuit, upper and lower portions of the separator 30 are preferably protruded outwards over 2 mm from the cathode 10 and the anode 20, respectively, and the cathode lead 6 and the anode lead 16 are preferably protruded outwards over 2 mm from the separator 30, respectively.

The housing 40 may have a cylindrical shape and be constituted with metallic or synthetic resin material, preferably aluminum or its alloy.

The housing 40 is used for receiving the cathode 10, the anode 20, the separator 30 for electrically separating the cathode 10 and the anode 20 from each other, and the cathode and anode leads 6, 16.

The inner cathode and anode terminals 51, 52 are arranged between the electrode unit 15 and the outer cathode and anode terminals 61, 62 in order to electrically connect the cathode and anode leads 6, 16 of the electrode unit 15 with the outer cathode and anode terminals 61, 62. Here, the inner cathode and anode terminals 51, 52 may be fixed to the electrode unit 15 by laser welding in order to reduce electric resistance with the electrode unit 15 and ensure secure connection.

Since the inner cathode and anode terminals 51, 52 are coupled with the electrode unit 15 by means of the laser welding, the inner cathode and anode terminals 51, 52 and the electrode unit 15 are locally integrated in the laser welding region, thereby minimizing micro discontinuous surfaces and further reducing the resistance against electric flow.

Figure 4:
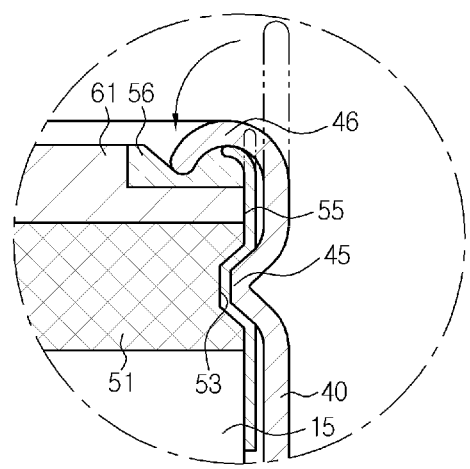
FIG. 4 is an enlarged sectional view showing the A portion of FIG. 3.

FIG. 4 is an enlarged sectional view showing the A portion of FIG. 3.

As shown in FIG. 4, in the energy storage device according to the present invention, the groove 53 is formed in the side of the inner cathode terminal 51, and the side protrusion 45 is formed on the inner wall of the housing at a location corresponding to the groove 53 of the inner cathode terminal 51, in order that the electrode unit 15 and the inner cathode unit 51 are fixed to the housing 40.

The side protrusion 45 is preferably formed by denting the sidewall of the housing 40 by means of beading at a location corresponding to the groove 53 formed in the side of the inner cathode terminal 51 so that the protruded portion of the sidewall of the housing 40 by denting is in agreement with the groove 53 in the side of the inner cathode terminal 51. The side protrusion 45 allows the electrode unit 15 coupled with the inner cathode terminal 51 to be directly fixed to the housing 40, thereby minimizing the shaking of the electrode unit 15 by an external vibration applied to the energy storage device.

Also, the outer cathode terminal 61 is structurally combined with the upper portion of the inner cathode terminal 51. The structural combination between the outer cathode terminal 61 and the inner cathode terminal 50 will be described in detail later.

In addition, an insulation film 55 is provided between the housing 40 and both of the inner and outer cathode terminals 51, 61 for the electric insulation between the housing 40 and the inner and outer cathode terminals 51, 61.

Further, an end portion 46 of the housing 40 is protruded over the uppermost portion of the outer cathode terminal 61 by a predetermined length, and the end portion 46 of the housing 40 is bent toward the outer cathode terminal 61 to fix the housing 40 to the outer cathode terminal 61. Here, a sealing member 56 may be provided to the outer cathode terminal 61 at a location where the end portion 46 of the housing 40 is bent and fixed, so as to keep the airtightness of the energy storage device.

Figure 5:
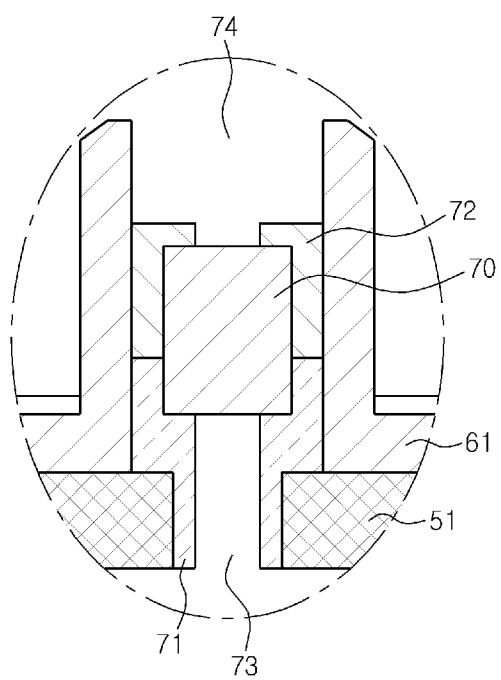
FIG. 5 is an enlarged sectional view showing the B portion of FIG. 3.

FIG. 5 is an enlarged sectional view showing the B portion of FIG. 3.

As shown in FIG. 5, in the energy storage device according to the present invention, openings 73, 74 are formed in the inner cathode terminal 51 and the outer cathode terminal 61, respectively, for the communication with the outside, and a pressure relief unit 70 is installed in the opening 74 of the outer cathode terminal 61 so as to relieve an increased inner pressure of the housing 40.

The pressure relief unit 70 has an elastic member (not shown) so that the elastic member is operated to relieve the inner pressure of the housing 40 if a pressure applied from the opening 73 of the inner cathode terminal 51 is over a predetermined level. If the inner pressure of the housing 40 is relieved below a predetermined level, the pressure relief unit 70 returns to its original position by means of the elastic force of the elastic member to close the housing 40.

As mentioned above, the pressure relief unit 70 plays a role of keeping the inner pressure of the housing below a predetermined level though a pressure over a predetermined level is applied to the housing 40, and also the pressure relief unit 70 plays a role of preventing impurities from flowing into the housing 40.

A coupling member 71 is coupled to the opening 73 of the inner cathode terminal 51 and the opening 74 of the outer cathode terminal 61. The coupling member 71 is installed in the opening 73 of the inner cathode terminal 51 and the opening 74 of the outer cathode terminal 61 and fixes the inner and outer cathode terminals 51, 61 to each other. The coupling member 71 also has a hollow therein. In this connection, the inner cathode terminal 51 and the outer cathode terminal 61 are structurally secured, and also the openings 73, 74 may be used as an electrolyte injection hole, which allows simplifying the assembling process of the energy storage device.

Here, the opening 73 of the inner cathode terminal 51 preferably has a relatively smaller diameter than the opening 74 of the outer cathode terminal 61. In this case, a step is formed between the openings 73, 74 due to the difference in diameters, and thus the coupling member 71 may be secured in a more stable way.

In addition, the coupling member 71 may have the same thickness at a region located at the opening 73 of the inner cathode terminal 51 and a region located at the opening 74 of the outer cathode terminal 61 so that the step formed due to the difference in diameters of the openings 73, 74 is also formed in the coupling member 71. This step may be used as a support when the pressure relief unit 70 is installed.

Here, the coupling member 71 may be constituted as a bolt on which a thread is formed, and a thread corresponding thereto may be formed in the opening 73 of the inner cathode terminal 51 and the opening 74 of the outer cathode terminal 61 so that the coupling member 71 is fixed to the inner and outer cathode terminals 51, 61 by means of bolt coupling.

As described above, in a state where the coupling member 71 is fixed to the opening 73 of the inner cathode terminal 51 and the opening 74 of the outer cathode terminal 61, the pressure relief unit 70 is placed and installed in the coupling member 71. Also, in a state where the coupling member 71 is installed, a fixing member 72 is coupled to the opening 74 of the outer cathode terminal 61 in order to fix the pressure relief unit 70.

Here, the fixing member 72 may be constituted as a bolt on which a thread is formed, and a thread corresponding thereto may be formed in the opening 74 of the outer cathode terminal 61 so that the fixing member 72 fixes the pressure relief unit 70 by means of bolt coupling. In addition, a sealing means (not shown) such as an O-ring may be further interposed between the pressure relief unit 70 and the fixing member 72 in order to prevent the electrolyte from leaking out. Also, the fixing member 72 may be inserted into the opening 74 of the outer cathode terminal 61, or for the better coupling, the pressure relief unit 70 may be fixed thereto by means of laser welding after the fixing member 72 is inserted into the opening 74 of the outer cathode terminal 61.

Meanwhile, though it is illustrated in this embodiment that the pressure relief unit 70 is installed to the opening 73 of the inner cathode terminal 51 and the opening 74 of the outer cathode terminal 61, the present invention is not limited thereto, and it is obvious that the pressure relief unit 70 may also be installed on the inner anode terminal 52 and the outer anode terminal 62. In this case, when the inner pressure of the housing 40 is increased, the increased pressure may be relieved at both upper and lower portions of the housing 40, which may solve any problem caused by the directivity of pressure.

As described above, the energy storage device according to the present invention allows the inner pressure of the housing 40 to be automatically relieved when the inner pressure exceeds a predetermined level, and thus there is no need to form a separate space between the electrode unit 15 and the inner side of the housing 40 where the electrode unit 15 is located, which was required conventionally in consideration of the generation of gas due to side reactions between the electrode unit and the electrolyte.

In a conventional energy storage device, a space should be formed between the electrode unit and the inner side of the housing in consideration of the generation of gas caused by side reactions.

However, in the present invention, since there is no need to form a separate space between the electrode unit 15 and the inner side of the housing 40, it is possible that the housing 40 is designed to have the substantially same diameter as the electrode unit 15.

Thus, the housing 40 of the energy storage device according to the present invention may be designed into a slimmer shape in comparison to conventional housings.

In addition, since the side protrusion 45 is fit with the groove 53 of the inner cathode terminal 51, the electrode unit 15 may be directly fixed to the housing 40, and thus it is possible to minimize the shaking of the electrode unit 15 due to external vibrations applied to the energy storage device.

Thus, it is possible to prevent the electrode unit 15 from being deformed or broken due to external vibrations.

Hereinafter, the present invention will be described in more detail based on examples of the present invention and comparative examples, for better understanding of the present invention.

EXAMPLES AND COMPARATIVE EXAMPLES

TABLE 1

|  | Vibration applied | No vibration applied |
|---|---|---|
| Example | 12 mA | 9 mA |
| Comparative example | 24 mA | 9 mA |

The table 1 shows measurement results of leakage currents of energy storage devices (according to the example) in which the side protrusion 45 is formed and fitted into the groove 53 formed in the side of the inner cathode terminal 51 according to the present invention, and energy storage devices (according to the comparative example) in which no side protrusion is formed, after charging for 12 hours.

As understood from the experiment results, the energy storage devices according to the example and the comparative examples exhibited the same leakage current when vibration was not applied thereto. However, when vibration was applied, the energy storage devices according to the example and the comparative examples exhibited different leakage currents.

In other words, it could be found that the energy storage device according to the example in which the side protrusion 45 is formed and fit into the groove 53 in the side of the inner cathode terminal 51 exhibited a reduced leakage current by half in comparison to the energy storage device of the comparative example.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

| Reference Symbols | |
|---|---|
| 6: cathode lead | 16: anode lead |
| 10: cathode | 15: electrode unit |
| 20: anode | 30: separator |
| 40: housing | 51: inner cathode terminal |
| 52: inner anode terminal | 61: outer cathode terminal |
| 62: outer anode terminal | 70: pressure relief unit |

What is claimed is:

1. An energy storage device, comprising:
   an electrode unit in which a cathode having a cathode lead, an anode having an anode lead, and a separator located between the cathode and the anode to separate the cathode and the anode from each other are rolled together;
   a housing receiving the electrode unit;
   an electrolyte filled in the housing;
   cathode and anode inner terminals respectively arranged in the housing to face the cathode and the anode of the electrode unit;
   cathode and anode outer terminals respectively connected to the cathode and anode inner terminals; and
   a pressure relief unit for relieving an inner pressure of the housing,
   wherein a groove is formed in a side of the cathode inner terminal, and a side protrusion is formed on an inner wall of the housing at a location corresponding to the groove,
   wherein openings are respectively formed in the cathode inner and outer terminals or the anode inner and outer terminals for the communication with the outside,
   wherein the opening of the inner terminal has a relatively smaller diameter that the opening of the outer terminal, and
   wherein the pressure relief unit is installed in the openings and selectively opens the openings in association with the change of the inner pressure of the housing when the inner pressure is increased over an allowable level.

2. The energy storage device according to claim 1, wherein the cathode electrode unit is coupled with the inner terminal by laser welding.

3. The energy storage device according to claim 1, wherein the side protrusion is formed by partially denting the side of the housing.

4. The energy storage device according to claim 1, wherein the side protrusion is formed to be fit with the groove of the cathode inner terminal.

5. The energy storage device according to claim 1, wherein the cathode outer terminal is fixed by bending an upper portion of the housing.

6. The energy storage device according to claim 5, further comprising a sealing member provided to the cathode outer terminal at a location where the upper portion of the housing is bent and fixed.

7. The energy storage device according to claim 1, further comprising an insulation film between the housing and both of the cathode inner and outer terminals.

8. The energy storage device according to claim 1, wherein the pressure relief unit is installed in the opening of the cathode or anode outer terminal.

9. The energy storage device according to claim 8, further comprising a coupling member installed through the openings of the cathode inner and outer terminals or the anode inner and outer terminals to couple the inner and outer terminals with each other, the coupling member having a hollow therein,
    wherein the pressure relief unit is mounted to a head of the coupling member so that the hollow of the coupling member is selectively opened or closed.

10. The energy storage device according to claim 9, further comprising a fixing member for fixing the pressure relief unit to the openings.

11. The energy storage device according to claim 10, further comprising a sealing means interposed between the pressure relief unit and the fixing member.

12. The energy storage device according to claim 11, wherein the fixing member and the coupling member are coupled to the openings by screwing, inserting, or inserting and laser-welding.

13. An energy storage device comprising:
    an electrode unit in which a cathode having a cathode lead, an anode having an anode lead, and a separator located between the cathode and the anode to separate the cathode and the anode from each other are rolled together;
    a housing receiving the electrode unit;
    an electrolyte filled in the housing;
    cathode and anode inner terminals respectively arranged in the housing to face the cathode and the anode of the electrode unit;
    cathode and anode outer terminals respectively connected to the cathode and anode inner terminals; and
    a pressure relief unit for relieving an inner pressure of the housing,
    wherein openings are respectively formed in the cathode inner and outer terminals or the anode inner and outer terminals for the communication with the outside, the opening of the inner terminal has a relatively smaller diameter than the opening of the outer terminal, and the pressure relief unit is installed in the openings and selectively opens the openings in association with the change of the inner pressure of the housing when the inner pressure is increased over an allowable level.

* * * * *